No. 610,195. Patented Sept. 6, 1898.
J. G. OBERMIER.
LUBRICATING AXLE.
(Application filed Mar. 12, 1898.)
(No Model.)
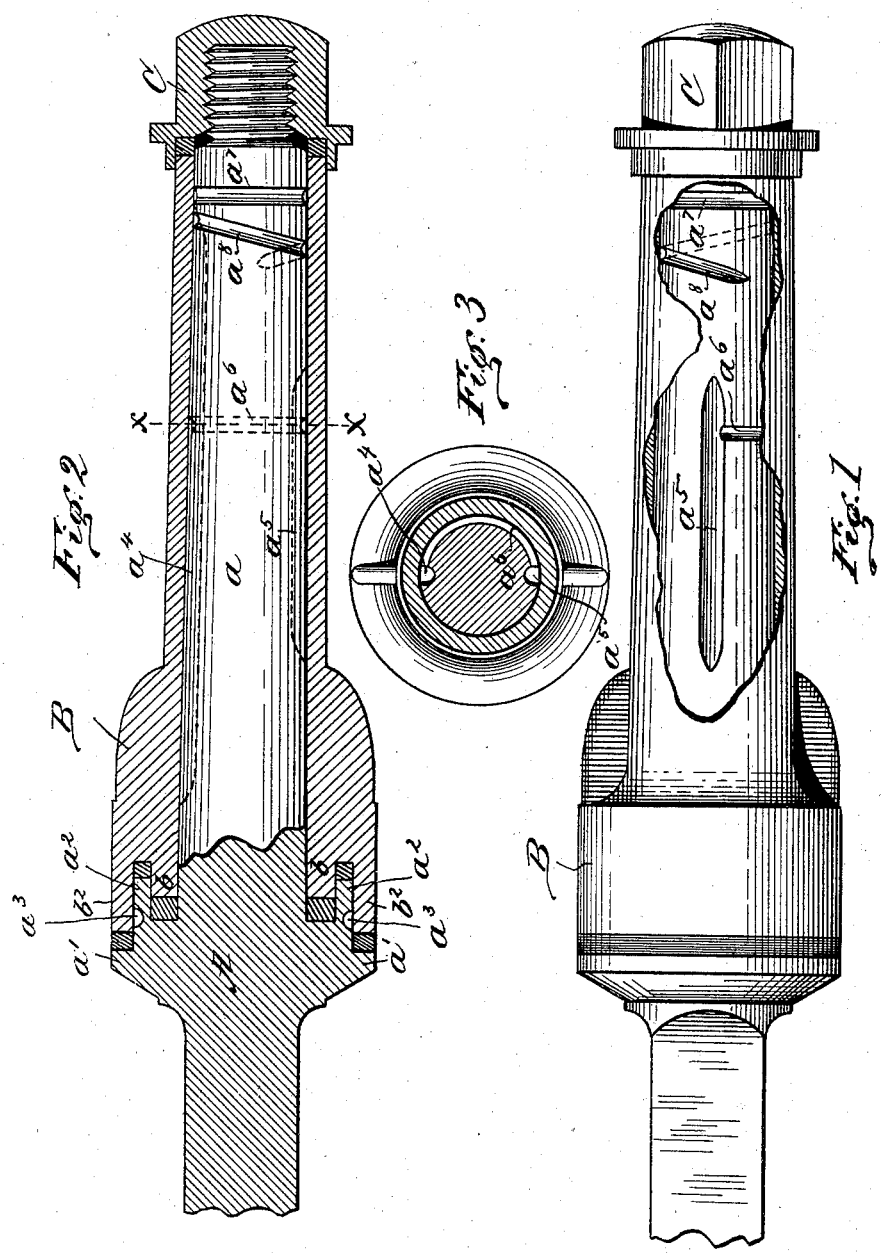
WITNESSES
INVENTOR
John G Obermier
by Chas. A. Miller
Attorney

UNITED STATES PATENT OFFICE.

JOHN G. OBERMIER, OF CANTON, OHIO.

LUBRICATING-AXLE.

SPECIFICATION forming part of Letters Patent No. 610,195, dated September 6, 1898.

Application filed March 12, 1898. Serial No. 673,635. (No model.)

*To all whom it may concern:*

Be it known that I, JOHN G. OBERMIER, a citizen of the United States, residing at Canton, in the county of Stark and State of Ohio, have invented new and useful Improvements in Lubricating-Axles, of which the following is a specification.

My invention relates to an improvement in dust-protecting and lubricating axles; and it consists of a tapering spindle proper provided with two longitudinal grooves and a connecting-groove for the purpose of carrying the oil and distributing it over the body of the spindle and in providing a circumferential groove at the outer end of the spindle and connecting with the longitudinal groove, by which the flow of the oil from the spindle is checked and returned to the longitudinal groove, as is hereinafter more fully described and claimed.

In the accompanying drawings similar letters of reference refer to similar parts.

Figure 1 is a side elevation of the spindle and box with a portion of the box cut away, showing the relation of the various parts. Fig. 2 is a longitudinal sectional view of the box and spindle. Fig. 3 is a cross-sectional view of the spindle and box at X X.

A represents the axle proper, which terminates in a spindle $a$. At the end of the axle and intermediate the spindle there is formed a projecting collar $a'$, having a tubular flange $a^2$, upon the outer surface of which there is provided a circumferential groove $a^3$ for the purpose of interrupting and preventing the passage of dust into and upon the spindle. Upon the upper portion of the spindle $a$ there is provided a longitudinal groove $a^4$, terminating just short of the inner and outer ends of the spindle. On the under side of the spindle there is provided another longitudinal groove $a^5$, and a smaller groove $a^6$ connects these two longitudinal grooves $a^4$ and $a^5$, the object being to provide a means of conducting the oil from one of the longitudinal grooves into the other, from which it is distributed to all points of the spindle.

Heretofore this object has been sought to be accomplished by the placing of small distributing-grooves near the center of the longitudinal groove; but this has been found to be defective, and the providing of two longitudinal grooves with the connecting-channel between the same prevents the draining of the oil into any one position when the vehicle is at rest and provides for its better distribution when the vehicle is in motion.

At the outer end of the spindle proper there is provided a circumferential groove $a^7$, connecting with the longitudinal groove $a^4$ and which acts as an absolute check against the exudation of the oil. To provide an additional check and means for returning the oil from the surface of the spindle to the longitudinal groove, a spiral groove $a^8$, passing partially around the spindle and communicating with the longitudinal groove $a^4$, is provided. The object of this spiral groove $a^8$ is to facilitate the return of the oil to the longitudinal groove and prevent the overloading of the circumferential groove $a^7$.

B represents the box, which is of tubular form, its interior adapted to conform in size and shape to that of the spindle. At the inner end of the box there is a raised collar carrying two tubular flanges. The inner flange $b$ is on the same plane as the interior of the box and, resting upon the spindle, passes between the spindle and the flange $a^2$ upon the axle. The outer flange $b^2$ is longer than the inner flange and passes over the flange $a^2$ and the circumferential groove $a^3$ thereon and abuts against a projecting collar $a'$ of the axle, thus forming a substantially dust-proof connection between the inner end of the box and the axle.

The outer end of the spindle is screw-threaded, so as to carry the ordinary form of nut C, by means of which the box is held in engagement with and in position upon the spindle.

Having thus fully described my invention, what I desire to secure and claim by Letters Patent is—

1. A solid axle-spindle, provided with oppositely-disposed parallel longitudinal grooves terminating short of the spindle ends, a distributing-groove connecting the same, a circumferential groove at the outer end of the spindle and connecting with one of the longitudinal grooves near its outer end, and a spiral groove extending partially around the spindle, one end merging into the plane of the spindle, and the other connected with said longitudinal groove, substantially as set forth.

2. A tapering axle-spindle, having oppositely-disposed parallel longitudinal grooves which end short of the spindle ends, a distributing-groove $a^6$ connecting said oppositely-disposed parallel grooves, a circumferential groove at the outer end of the spindle and connected with one of the longitudinal grooves, substantially as set forth.

3. An axle-spindle having at its inner end an enlarged head provided with a projecting collar $a'$, and an inner annular flange provided with an annular groove, forming a dust-trap, in combination with a box, having a short inner annular flange and an outer annular flange, the latter of which projects over the inner annular flange and groove, abutting against the projecting collar of the axle, substantially as set forth.

In testimony whereof I have hereunto set my hand in the presence of two subscribing witnesses.

JOHN G. OBERMIER.

Witnesses:
CHAS. R. MILLER,
CHAS. M. BALL.